(12) United States Patent
Kresse et al.

(10) Patent No.: US 9,705,990 B2
(45) Date of Patent: Jul. 11, 2017

(54) TRANSFER OF DIGITAL DATA TO MOBILE SOFTWARE SYSTEMS

(71) Applicant: TOYOTA JIDOSHA KABUSHIKI KAISHA, Toyota-shi, Aichi-ken (JP)

(72) Inventors: Matthew Kresse, Sunnyvale, CA (US); Vinuth Rai, San Jose, CA (US); Roger Melen, Los Altos Hills, CA (US)

( * ) Notice: Subject to any disclaimer, the term of this patent is extended or adjusted under 35 U.S.C. 154(b) by 253 days.

(21) Appl. No.: 14/297,109

(22) Filed: Jun. 5, 2014

(65) Prior Publication Data

US 2015/0358955 A1    Dec. 10, 2015

(51) Int. Cl.
| | | |
|---|---|---|
| *H04W 4/00* | (2009.01) | |
| *H04L 29/08* | (2006.01) | |
| *G06Q 30/02* | (2012.01) | |
| *H04W 4/02* | (2009.01) | |
| *H04W 4/04* | (2009.01) | |

(52) U.S. Cl.
CPC ......... *H04L 67/12* (2013.01); *G06Q 30/0255* (2013.01); *H04L 67/104* (2013.01); *H04W 4/028* (2013.01); *H04W 4/046* (2013.01)

(58) Field of Classification Search
CPC ....... H04W 4/02; H04W 4/028; H04W 4/046; H04W 64/006; H04W 84/005; H04L 67/12; H04L 67/104; G06Q 30/0207; G06Q 30/0255; G06Q 30/0261
USPC ....... 370/252, 310, 328, 338, 329; 455/11.1, 455/456.2; 705/14.1, 14.53; 340/905
See application file for complete search history.

(56) References Cited

U.S. PATENT DOCUMENTS

| | | | |
|---|---|---|---|
| 7,979,023 B2* | 7/2011 | Gavrilovich | H04B 7/1555 375/295 |
| 2012/0221188 A1 | 8/2012 | Kelly, III | |
| 2012/0310713 A1* | 12/2012 | Mercuri et al. | G06Q 30/0207 705/14.1 |
| 2013/0217414 A1* | 8/2013 | Nagaraj | H04W 84/005 455/456.2 |
| 2014/0156396 A1* | 6/2014 | deKozan et al. | G06Q 30/0261 705/14.53 |
| 2015/0339921 A1* | 11/2015 | Hainzlmaier et al. | H04L 67/104 340/905 |

OTHER PUBLICATIONS

"Navfusion Provides Map Updates via a Smart Phone App," Sep. Oct. 2013, p. 67, vol. 19, iTS International, Swanley, Kent UK.

(Continued)

*Primary Examiner* — Kwang B Yao
*Assistant Examiner* — Harun Chowdhury
(74) *Attorney, Agent, or Firm* — Burbage Law, P.C.; Jon-Michael Burbage; Elizabeth Ruzich

(57) ABSTRACT

The disclosure includes a system and method for communicating digital data from a mobile client device to a mobile system. The system includes a processor and a memory storing instructions that, when executed, cause the system to: obtain journey context data that includes data describing a future journey; determine digital data to transmit to the mobile system based on the journey context data; detect a presence of the mobile system; verify that the digital data is valid for the mobile system based on the journey context data; and send the digital data to the mobile system responsive to detecting the presence of the mobile system and the digital data being valid for the mobile system.

16 Claims, 7 Drawing Sheets

(56) References Cited

OTHER PUBLICATIONS

Kaiser, Tiffany, "Drivers Want to Use Smartphones in Cars, Not Infotainment Systems' Software," Jul. 18, 2013, 1 page, retrieved from http://www.dailytech.com/Drivers+Want+to+Use+Smartphones+in+Cars+Not+Infotainment+Systems+Software/article31997.htm on Jun. 3, 2014.

* cited by examiner

TRANSFER OF DIGITAL DATA TO MOBILE SOFTWARE SYSTEMS

BACKGROUND

The specification relates to transferring digital data between mobile systems. In particular, the specification relates to communicating digital data between multiple mobile systems and applying the digital data in the multiple mobile systems.

In-vehicle services such as navigation service and infotainment service may be improved over time by updating the services using digital data transferred from other devices or servers. For example, digital data may be transmitted to a vehicle and used for many purposes including updating the services in the vehicle. However, the transmission of digital data to the vehicle may be a challenge. For example, the transmission of digital data to the vehicle may drain the vehicle's battery, causing a failure to start the vehicle. In another example, a transmission of digital data to a vehicle during the operation of that vehicle may interfere with and may be disruptive to other higher priority communications to the vehicle.

SUMMARY

According to one innovative aspect of the subject matter described in this disclosure, a system for communicating digital data from a mobile client device to a mobile system includes a processor and a memory storing instructions that, when executed, cause the system to: obtain journey context data that includes data describing a future journey; determine digital data to transmit to the mobile system based on the journey context data; detect a presence of the mobile system; verify that the digital data is valid for the mobile system based on the journey context data; and send the digital data to the mobile system responsive to detecting the presence of the mobile system and the digital data being valid for the mobile system.

According to another innovative aspect of the subject matter described in this disclosure, a system for communicating digital data from a storage system to a mobile system includes a processor and a memory storing instructions that, when executed, cause the system to: receive data describing a list of first mobile systems and a second mobile system; determine digital data to transfer from a storage system to the second mobile system; detect a first network availability between the storage system and one or more first mobile systems from the list; transfer the digital data from the storage system to the one or more first mobile systems responsive to detecting the first network availability; detect a second network availability between the second mobile system and at least one first mobile system from the one or more first mobile systems; verify that the digital data is valid for the second mobile system based on journey context data associated with the second mobile system; and transfer the digital data from the at least one first mobile system to the second mobile system responsive to detecting the second network availability and the digital data being valid for the second mobile system.

According to yet another innovative aspect of the subject matter described in this disclosure, a system for communicating digital data from a mobile system to a storage system includes a processor and a memory storing instructions that, when executed, cause the system to: receive data describing a list of first mobile systems and a second mobile system; determine digital data to transfer from the second mobile system to a storage system; detect a first network availability between the second mobile system and one or more first mobile systems from the list; transfer the digital data from the second mobile system to the one or more first mobile systems responsive to detecting the first network availability; detect a second network availability between the storage system and at least one first mobile system from the one or more first mobile systems; verify that the digital data is valid for the at least one first mobile system; transfer the digital data from the at least one first mobile system to the storage system responsive to detecting the second network availability and the digital data being valid for the at least one first mobile system; and verify that the transferred digital data is valid for the storage system.

In general, yet another innovative aspect of the subject matter described in this disclosure may be embodied in methods that include: obtaining journey context data that includes data describing a future journey; determining digital data to transmit to a mobile system based on the journey context data; detecting a presence of the mobile system; verifying that the digital data is valid for the mobile system based on the journey context data; and sending the digital data to the mobile system responsive to detecting the presence of the mobile system and the digital data being valid for the mobile system.

In general, yet another innovative aspect of the subject matter described in this disclosure may be embodied in methods that include: receiving data describing a list of first mobile systems and a second mobile system; determining digital data to transfer from a storage system to the second mobile system; detecting a first network availability between the storage system and one or more first mobile systems from the list; transferring the digital data from the storage system to the one or more first mobile systems responsive to detecting the first network availability; detecting a second network availability between the second mobile system and at least one first mobile system from the one or more first mobile systems; verifying that the digital data is valid for the second mobile system based on journey context data associated with the second mobile system; and transferring the digital data from the at least one first mobile system to the second mobile system responsive to detecting the second network availability and the digital data being valid for the second mobile system.

In general, yet another innovative aspect of the subject matter described in this disclosure may be embodied in methods that include: receiving data describing a list of first mobile systems and a second mobile system; determining digital data to transfer from the second mobile system to a storage system; detecting a first network availability between the second mobile system and one or more first mobile systems from the list; transferring the digital data from the second mobile system to the one or more first mobile systems responsive to detecting the first network availability; detecting a second network availability between the storage system and at least one first mobile system from the one or more first mobile systems; verifying that the digital data is valid for the at least one first mobile system; transferring the digital data from the at least one first mobile system to the storage system responsive to detecting the second network availability and the digital data being valid for the at least one first mobile system; and verifying that the transferred digital data is valid for the storage system.

Other aspects include corresponding methods, systems, apparatus, and computer program products for these and other innovative aspects.

These and other implementations may each optionally include one or more of the following operations and features. For instance, the features include: determining time-sensitive digital data based on an estimated departure time and/or an estimated arrival time associated with the future journey; the time-sensitive digital data being associated with an expiration time and being valid at least during a time period between the estimated departure time and the estimated arrival time; determining that a current time is before the expiration time of the time-sensitive digital data; verifying that the time-sensitive digital data is valid for the mobile system responsive to the current time being before the expiration time; determining location-based digital data based on an estimated route associated with the future journey; determining a current location associated with the mobile client device; determining that the current location is along the estimated route; verifying that the location-based digital data is valid for the mobile system responsive to the current location being along the estimated route; the mobile system including a vehicle; the at least one first mobile system including at least one mobile computing device and the second mobile system including a vehicle; and the at least one first mobile system including at least one first vehicle and the second mobile system including a second vehicle; the digital data including software update data; and the software update data being transferred from the second mobile system to the storage system responsive to detecting the second mobile system being in a key-off state.

For instance, the operations include: storing the digital data on different mobile client devices; sending the digital data from the different mobile client devices to the mobile system simultaneously; receiving new mobile system data from the mobile system; and forwarding the new mobile system data to a data log server; determining a state of a battery management system in the second mobile system; and performing software update on the second mobile system based on the software update data.

Throughout the disclosure, the term "digital data" may be used to represent any digital data undergoing the transfer operations described herein. The digital data may include, but is not limited to, update data used to update vehicle services, data to be shared between two or more entities (e.g., storage systems, mobile systems, mobile client systems, etc.), and data to be transferred between two or more entities.

The disclosure is particularly advantageous in a number of respects. For example, when a mobile client device (e.g., a smartphone) has access to a network (e.g., the Internet), the system described herein may use the mobile client device to obtain digital data for a mobile system (e.g., a vehicle) from a service server. The system may store the digital data on a storage device associated with the mobile client device. The system may also customize the digital data for the mobile system using journey context data describing an estimated future journey. In response to detecting the presence of the mobile system in proximity to the mobile client device, the system may transmit the digital data from the mobile client device to the mobile system for updating services in the mobile system.

In some examples, the digital data may be stored on multiple mobile client devices and transmitted to the mobile system simultaneously from the multiple mobile client devices to achieve a faster data transfer speed. The simultaneous transmission of digital data to the mobile system is beneficial when there is a large amount of digital data to transmit to the mobile system.

In some examples, the system described herein may also receive new mobile system data (e.g., new vehicle data) from the mobile system and may forward the new mobile system data to a data log server. The advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
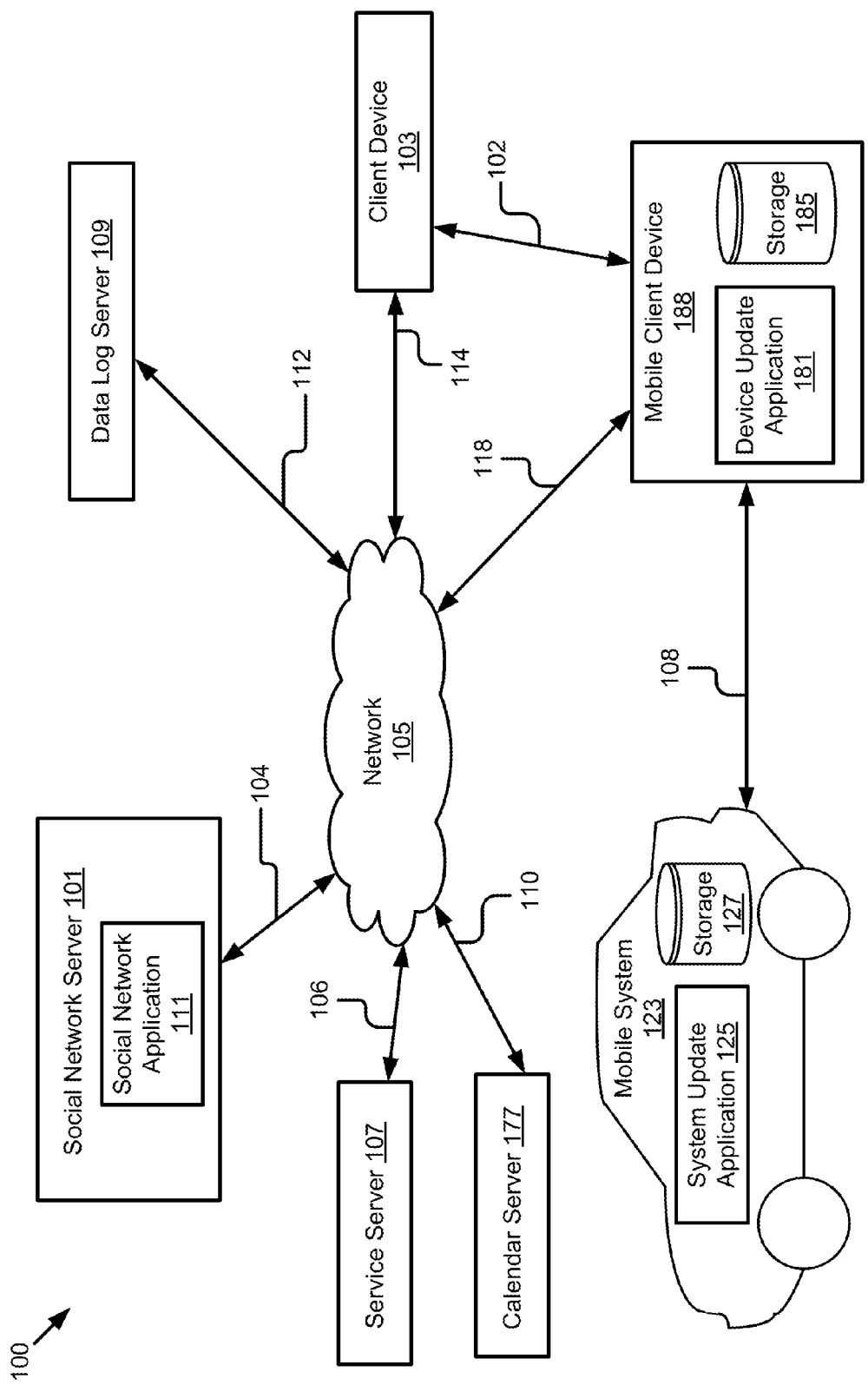
FIG. 1 is a block diagram illustrating an example system for updating services in a mobile system using a mobile client device.

FIG. 1 illustrates a block diagram of some implementations of a system 100 for updating services in a mobile system using a mobile client device. The system 100 includes a social network server 101, a data log server 109, a client device 103, a mobile client device 188, a mobile system 123, a calendar server 177, and a service server 107. The system 100 may include other servers or devices not shown in FIG. 1 including, for example, a traffic server for providing traffic data, a weather server for providing weather data, and a map server for providing map data, etc.

In some implementations, these entities of the system 100 may be communicatively coupled via a network 105. For example, the social network server 101 may be communicatively coupled to the network 105 via a signal line 104. The data log server 109 may be communicatively coupled to the network 105 via a signal line 112. The client device 103 may be communicatively coupled to the network 105 via a signal line 114. The mobile client device 188 may be communicatively coupled to the network 105 via a signal line 118. The calendar server 177 may be communicatively coupled to the network 105 via a signal line 110. The service server 107 may be communicatively coupled to the network 105 via a signal line 106.

While FIG. 1 illustrates one social network server 101, one data log server 109, one client device 103, one mobile client device 188, one mobile system 123, one calendar server 177, and one service server 107, the disclosure applies to a system architecture including one or more social network servers 101, one or more data log servers 109, one or more client devices 103, one or more mobile client devices 188, one or more mobile systems 123, one or more calendar servers 177, and one or more service servers 107. Furthermore, although FIG. 1 illustrates one network 105 coupled to the entities of the system 100, in practice one or more networks 105 can be connected to these entities.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc.

The client device 103 may be a computing device that includes a memory and a processor, for example, a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 105. A user may interact with the client device 103.

The mobile client device 188 may be a mobile computing device that includes a memory and a processor, for example, a laptop computer, a tablet computer, a mobile telephone (e.g., a smartphone), a personal digital assistant ("PDA"), a mobile e-mail device, a portable game player, a portable music player, or another mobile electronic device capable of accessing the network 105. A user may interact with the mobile client device 188. The mobile client device 188 may be communicatively coupled to the mobile system 123 via a signal line 108. In some implementations, the mobile client device 188 may be a device similar to the mobile system 123. For example, the mobile client device 188 includes a vehicle.

In some implementations, the mobile client device 188 may be directly coupled to the network 105 via the signal line 118 for communication with other entities in the system 100. In some other implementations, the mobile client device 188 may be communicatively coupled to the client device 103 via a signal line 102. The mobile client device 188 may access the network 105 via the client device 103 for communication with other entities in the system 100. For example, the mobile client device 188 may be a smartphone coupled to a desktop computer using a universal serial bus (USB) line. The desktop computer may receive calendar data from the calendar server 177 via the network 105 and may forward the calendar data to the mobile client device 188. Additionally or alternatively, the mobile client device 188 may send mobile system data to the client device 103, causing the client device 103 to forward the mobile system data to the data log server 109 via the network 105. As illustrated in FIG. 1, the mobile client device 188 includes a device update application 181 and a storage 185. The mobile client device 188 may additionally include one or more sensors such as a global positioning system (GPS), a pedometer, an accelerator, and other types of sensors.

The device update application 181 may include code and routines for processing updates on the mobile client device 188. In some implementations, the device update application 181 can be implemented using hardware including a field-programmable gate array ("FPGA") or an application-specific integrated circuit ("ASIC"). In some other implementations, the device update application 181 can be implemented using a combination of hardware and software. The device update application 181 may be stored in a combination of the devices and servers, or in one of the devices or servers. The device update application 181 is described in more detail below with reference to FIGS. 2 and 4-5B.

The storage 185 can be a non-transitory storage medium that stores data for providing the functionality described herein. The storage 185 may be a dynamic random access memory (DRAM) device, a static random access memory (SRAM) device, flash memory, or some other memory devices. In some implementations, the storage 185 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The mobile system 123 may be a mobile communication node. For example, the mobile system 123 may be a vehicle (e.g., an automobile, a bus, an airplane, a boat), a bionic implant, or any other mobile system. In some implementations, the mobile system 123 may include a computing device that includes a memory and a processor. A user may interact with the mobile system 123. In some implementations, the mobile system 123 may include a mobile client device. For example, the mobile system 123 may include a tablet, a smartphone, and another type of computing device.

In some implementations, the mobile system 123 may include one or more sensors (not shown), such as a navigation sensor (e.g., a GPS sensor), an infrared detector, a motion detector, a thermostat, a sound detector, and any other type of sensors. For example, the mobile system 123 may include sensors for measuring one or more of a current time, a current location (e.g., a latitude, longitude, and altitude of a location), an acceleration of a vehicle, a velocity of a vehicle, a fuel tank level, and a battery level of a vehicle, etc.

As illustrated in FIG. 1, the mobile system 123 includes a system update application 125 and a storage 127. The system update application 125 may include code and routines for processing updates on the mobile system 123. In some implementations, the system update application 125 can be implemented using hardware including an FPGA or an ASIC. In some other implementations, the system update application 125 can be implemented using a combination of hardware and software. The system update application 125 may be stored in a combination of the devices and servers, or in one of the devices or servers. The system update application 125 is described below in more detail with reference to FIGS. 3 and 6.

The storage 127 can be a non-transitory storage medium that stores data for providing the functionality described herein. The storage 127 may be a dynamic random access memory (DRAM) device, a static random access memory (SRAM) device, flash memory, or some other memory devices. In some implementations, the storage 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The social network server 101 can be a hardware server that includes a processor, a memory, and network communication capabilities. The social network server 101 sends and receives data to and from other entities of the system 100 via the network 105. The social network server 101 includes a social network application 111. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

The social network server 101 and the social network application 111 can be representative of one social network and that there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus.

The service server 107 can be a hardware server that includes a processor, a memory, and network communication capabilities. The service server 107 may send and receive data to and from other entities of the system 100 via the network 105. In some implementations, the service server 107 may provide various services to the mobile system 123. For example, the service server 107 may provide one or more of navigation service, infotainment service, and software update service to the mobile system 123. In some implementations, the service server 107 sends digital data (e.g., navigation updates, infotainment updates, software updates, advertisement updates, etc.) to the mobile client device 188, causing the mobile client device 188 to forward the digital data to the mobile system 123.

The data log server 109 can be a hardware server that includes a processor, a memory, and network communication capabilities. The data log server 109 may send and receive data to and from other entities of the system 100 via the network 105. For example, the data log server 109 receives data describing new mobile system data (e.g., new vehicle data) from the mobile client device 188 and stores the new mobile system data in a storage device associated with the data log server 109. In another example, the data log server 109 sends historical journey data associated with the mobile system 123 to the mobile client device 188.

The calendar server 177 can be a hardware server that includes a processor, a memory, and network communication capabilities. The calendar server 177 sends and receives data to and from other entities of the system 100 via the network 105. For example, the calendar server 177 sends data describing a user's calendar to the mobile client device 188 with permission from the user.

Example Device Update Application

Figure 2:
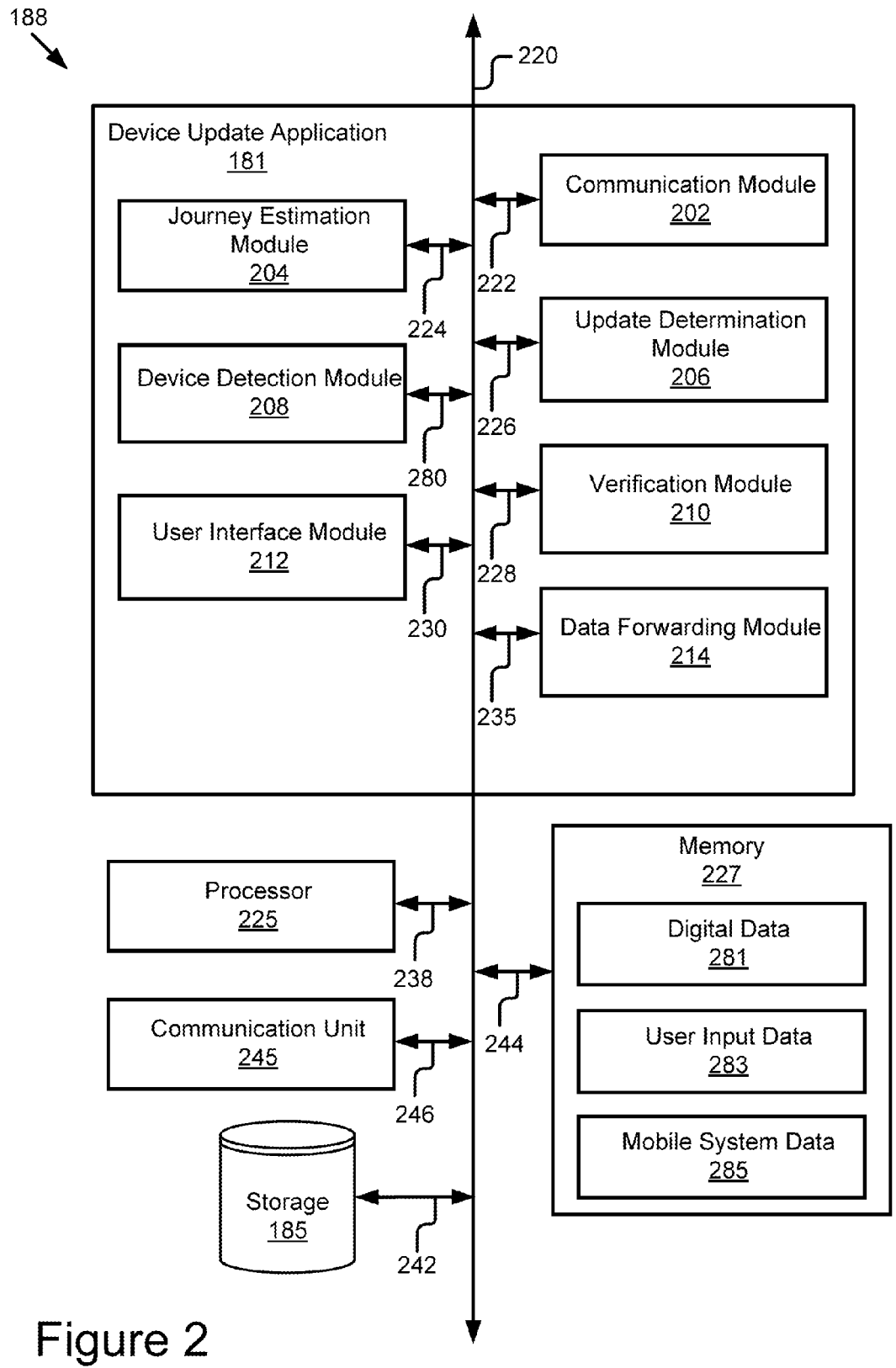
FIG. 2 is a block diagram illustrating an example mobile client device that includes an example device update application.

Referring now to FIG. 2, an example of the device update application 181 is shown in more detail. FIG. 2 is a block diagram of the mobile client device 188 that includes the device update application 181, a processor 225, a communication unit 245, the storage 185, and a memory 227 according to some examples. The components of the mobile client device 188 are communicatively coupled by a bus 220. The storage 185 may be communicatively coupled to the bus 220 via a signal line 242.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 238. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores digital data 281, user input data 283, and mobile system data 285. The memory 227 may also store other data for providing the functionality described herein. The digital data 281 may include, but is not limited to, digital data describing updates for the mobile system 123, data to be shared with the mobile system 123, and data to be transferred to the mobile system 123. For example, the digital data 281 includes one or more of software program updates, navigation updates (e.g., map updates), traffic updates, road information updates (e.g., road construction updates), and infotainment updates (e.g., music updates, podcast updates, video updates, advertisement updates including deals, coupons, and restaurant recommendations). Other example digital data is possible.

The user input data 283 may include data inputted by the user. The mobile system data 285 may include data associated with the mobile system 123. For example, the mobile system data 285 includes an identifier identifying the mobile system 123 (e.g., a vehicle identification number), one or more users associated with the mobile system 123 (e.g., a driver in a vehicle, a passenger in the vehicle), historical journey data associated with a user operating the vehicle (e.g., start points, destinations, durations, routes associated with historical journeys), and other vehicle data associated with the vehicle.

The communication unit 245 transmits and receives data to and from at least one of the mobile system 123, the client device 103, and other servers 101, 107, 109, 177 in the system 100. The communication unit 245 is coupled to the bus 220 via a signal line 246. In some implementations, the communication unit 245 includes a port for direct physical connection to the network 105 or to another communication channel. For example, the communication unit 245 includes a USB, SD, CAT-5, or similar port for wired communication with other entities in the system 100. In some implementations, the communication unit 245 includes a wireless transceiver for exchanging data with other entities in the system 100 or other communication channels using one or more wireless communication methods, including IEEE 802.11, IEEE 802.16, Bluetooth®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

In the illustrated implementation shown in FIG. 2, the device update application 181 includes a communication module 202, a journey estimation module 204, an update determination module 206, a device detection module 208, a verification module 210, a user interface module 212, and a data forwarding module 214. These modules of the device update application 181 are communicatively coupled to each other via the bus 220. For simplicity and illustration purposes only, the functionality of the various modules in the device update application 181 are described below with reference to a vehicle, which is an example of the mobile system 123. The description also applies to other example mobile systems.

In some implementations, modules of the device update application 181 can be stored in a single server or device. In some other implementations, modules of the device update application 181 can be distributed and stored across multiple servers or devices. Furthermore, the separation of various components, modules, and servers in the implementations described herein should not be understood as requiring such separation in all implementations. In some implementations, the described components, modules, devices, or servers can generally be integrated together in a single component, module, device, or server.

In some implementations, each of the modules 202, 204, 206, 208, 210, 212, and 214 in the device update application 181 can be a set of instructions executable by the processor 225 to provide the functionality described below. In some other implementations, each of the modules 202, 204, 206, 208, 210, 212, and 214 can be stored in the memory 227 of the mobile client device 188 and can be accessible and executable by the processor 225. Each of the modules 202, 204, 206, 208, 210, 212, and 214 may be adapted for cooperation and communication with the processor 225 and other components of the mobile client device 188.

The communication module 202 can be software including routines for handling communications between the device update application 181 and other components of the mobile client device 188. The communication module 202 may be communicatively coupled to the bus 220 via a signal line 222. The communication module 202 sends and receives data, via the communication unit 245, to and from one or more of the mobile system 123, the client device 103, the social network server 101, the data log server 109, the service server 107, and the calendar server 177. For example, the communication module 202 receives, via the communication unit 245, social network data from the social network server 101 and sends the social network data to the journey estimation module 204. In another example, the communication module 202 receives digital data from the verification module 210 and sends the digital data to the vehicle via the communication unit 245.

In some implementations, the communication module 202 receives data from components of the device update application 181 and stores the data in one or more of the storage 185 and the memory 227. In some implementations, the communication module 202 retrieves data from the storage 185 or the memory 227 and sends the data to one or more components of the device update application 181. In some implementations, the communication module 202 may handle communications between components of the device update application 181. For example, the communication module 202 receives journey context data from the journey estimation module 204 and sends the journey context data to the update determination module 206.

The journey estimation module 204 can be software including routines for estimating a future journey for a user. The journey estimation module 204 may be communicatively coupled to the bus 220 via a signal line 224. In some implementations, the journey estimation module 204 receives historical journey data associated with the vehicle or a user operating on the vehicle from the memory 227, the storage 185, or the data log server 109. The user may be a driver or a passenger of the vehicle. The journey estimation module 204 estimates a future journey for the vehicle based on the historical journey data. For example, the journey estimation module 204 estimates journey context data describing the estimated future journey based on the historical journey data. In a further example, if the historical journey data indicates that the user usually drives the vehicle to work from home between 8:00 AM and 8:30 AM on weekdays, the journey estimation module 204 estimates a future journey for the vehicle as a journey departing from home to work with a departure time of 8:00 AM in the next morning.

In some implementations, the journey context data includes an estimated start point, an estimated destination, an estimated departure time, an estimated route, an estimated duration, and an estimated arrival time at the destination, etc. The journey context data may include other data associated with the estimated future journey such as one or more users estimated to participate in the future journey (e.g., a driver and one or more passengers potentially engaging in the estimated future journey) and a purpose or a goal of the estimated future journey (e.g., picking up a person from an airport, a vacation trip, a trip for shopping, etc.). In some other implementations, at least part of the journey context data is not obtained from estimation. For example, a user may manually input journey context data for a future journey including, but not limited to, a departure time, a destination, one or more participants in the future journey, etc. In another example, the journey context data may include identity data related to a mobile system 123 (e.g., a vehicle identifier, a model and a make of the vehicle) that the user uses to take the future journey or identity data related to a mobile client device 188 (e.g., data identifying a smartphone) that the user brings along during the future journey. In another implementation, journey context data which is journey related may be newly created or modified during a journey. Other example journey context data are possible.

In some implementations, the journey estimation module 204 receives time synchronicity data from the memory 227 or from a GPS sensor in the mobile client device 188. The journey estimation module 204 determines a synchronized local time associated with the vehicle based on the time synchronicity data. The journey estimation module 204 receives one or more of weather data from a weather server (not shown), calendar data from the calendar server 177, and social network data from the social network server 101. The journey estimation module 204 estimates a future journey for the vehicle based on one or more of the synchronized local time, the weather data, the calendar data, and the social network data. The journey estimation module 204 generates journey context data describing the estimated future journey. For example, if the calendar data indicates that the user has a doctor appointment at 9:00 AM in the next morning and a travel time from home to the doctor's office is less than half an hour, the journey estimation module 204 may estimate a future journey for the user as a journey from home to the doctor's office with an estimated departure time of 8:30 AM in the next morning.

The time synchronicity data can be data used to synchronize a device time with a universal time. For example, the time synchronicity data can be configured to synchronize a local time associated with a vehicle or a mobile client device with a universal time. In some implementations, a local time may be synchronized with the Coordinated Universal Time (UTC) defined by International Telecommunications Union Recommendation (ITU-R TF.460-6) according to a corresponding local time zone. In some other implementations, a local time may be synchronized by timekeeping technologies including GPS satellites and a network time protocol (NTP). The network time protocol may include a networking protocol for clock synchronization between computer systems over packet-switched variable-latency data networks.

In some implementations, the journey estimation module 204 sends the journey context data describing the estimated future journey to one or more of the update determination module 206 and the verification module 210. In some other implementations, the journey estimation module 204 stores the journey context data in the storage 185 or the memory 227.

The update determination module 206 can be software including routines for determining digital data such as digital data for the vehicle. The update determination module 206 may be communicatively coupled to the bus 220 via a signal line 226. In some implementations, the update determination module 206 receives journey context data describing an estimated future journey from the journey estimation module 204, where the journey context data includes an estimated start point, an estimated destination, an estimated route, an estimated departure time, and an estimated arrival time associated with the estimated future journey.

The update determination module 206 determines digital data for the vehicle based on the journey context data. For example, assume the journey context data indicates that the user may take a journey to a particular destination in the next five hours. The update determination module 206 determines digital data for the vehicle that includes navigation information for the future journey, recent road construction information associated with the estimated route of the future journey, recommended restaurants along the estimated route, deals and coupons for stores along the estimated route, and entertainment content data customized for one or more users estimated to participate in the future journey, etc.

In some implementations, the digital data may include software program updates for updating one or more software programs installed in the vehicle. In some implementations, the digital data includes time-sensitive digital data associated with an expiration time. The time-sensitive digital data may expire after the expiration time. For example, the time-sensitive digital data includes time-sensitive deals for stores or restaurants along the estimated route of the future journey, where the time-sensitive deals are valid at least during a time period between the estimated departure time and the estimated arrival time. In some implementations, the digital data includes location-based digital data. For example, the digital data includes road construction information associated with the estimated route of the future journey. In some implementations, the digital data includes content data customized for one or more users that are likely to participate in the estimated future journey. For example, if the journey context data indicates that a child will be onboard in the vehicle during the estimated journey, the digital data may include the child's favorite cartoons. Example content data includes, but is not limited to, videos, movies, audio books, TV shows, podcasts, and music, etc.

In some implementations, the update determination module 206 retrieves the digital data from one or more servers (e.g., the service server 107) while the mobile client device 188 has access to the network 105. The update determination module 206 may also receive user input data via a user interface presented on a display device coupled to the mobile client device 188. The update determination module 206 stores the digital data and the user input data in the storage 185. In response to the device detection module 208 detecting the presence of the vehicle in proximity to the mobile client device 188, the update determination module 206 sends the digital data and the user input data to the verification module 210 for verifying the digital data and transmitting the digital data to the vehicle. For example, the update determination module 206 on the mobile client device 188 determines the digital data and retrieves the digital data for the vehicle from the service server 107 while the mobile client device 188 has access to a Wi-Fi network at home. The mobile client device 188 temporarily stores the digital data in the storage 185 prior to a journey so that the mobile client device 188 may send the digital data to the vehicle when the user carrying the mobile client device 188 starts the journey.

The device detection module 208 can be software including routines for detecting the presence of the vehicle. The device detection module 208 may be communicatively coupled to the bus 220 via a signal line 280. In some implementations, the device detection module 208 scans for the vehicle in the surrounding environment. If the vehicle is in proximity to the mobile client device 188, the device detection module 208 detects the presence of the vehicle. For example, if the user carrying the mobile client device 188 is onboard in the vehicle, the device detection module 208 stored on the mobile client device 188 detects the presence of the vehicle. In some examples, the mobile client device 188 and the vehicle are at the same location when the device detection module 208 detects the presence of the vehicle.

Alternatively or additionally, the device detection module 208 receives a user input indicating the vehicle is in proximity to the mobile client device 188. For example, when the user has entered the vehicle, the user may issue a command on the mobile client device 188 for transferring the digital data from the mobile client device 188 to the vehicle. The device detection module 208 detects that the vehicle is in proximity to the mobile client device 188 based on the user command.

The device detection module 208 authenticates the vehicle using one or more authentication procedures. For example, the device detection module 208 on the mobile client device 188 may receive a beacon signal from the vehicle and authenticates the vehicle based on the beacon signal. The beacon signal may include an identifier of the vehicle. The device detection module 208 establishes a communication link between the mobile client device 188 and the vehicle for sending the digital data to the vehicle and receiving new mobile system data from the vehicle. In some implementations, the communication link includes a wireless connection (e.g., Bluetooth®, NFC, etc.). In some other implementations, the communication link includes a wired connection (e.g., a connection using a USB line, a connection using a cable, etc.).

In some implementations, the device detection module 208 may cooperate with a system detection module 306 stored in the vehicle for detecting the presence of the vehicle, authenticating the vehicle, and establishing a communication link between the mobile client device 188 and the vehicle.

The verification module 210 can be software including routines for verifying digital data for the vehicle. The verification module 210 may be communicatively coupled to the bus 220 via a signal line 228. In some implementations, the verification module 210 determines a current time based on the time synchronicity data. The verification module 210 receives location data from a GPS sensor coupled to the mobile client device 188 or the vehicle. The verification module 210 determines a current location of the mobile client device 188 or the vehicle based on the location data. The verification module 210 receives journey context data from the journey estimation module 204. The verification module 210 verifies whether the digital data is still valid for the vehicle based on one or more of the current time, the current location, and the journey context data as described below in more detail.

In some implementations, the digital data includes time-sensitive digital data that expires after an expiration time. The verification module 210 verifies whether the time-sensitive digital data is still valid for the vehicle based on the current time and the expiration time. For example, the verification module 210 determines that the current time is before the expiration time of the time-sensitive digital data, and verifies that the time-sensitive digital data is still valid for the vehicle responsive to the current time being before the expiration time. If the current time is after the expiration time, the verification module 210 determines that the time-sensitive digital data has expired and is invalid. The expired digital data may not be transmitted to the vehicle.

In a further example, the journey estimation module 204 may estimate a future journey describing that the user may drive the vehicle to a shopping mall in the next morning based on the user's calendar data. The update determination module 206 may determine time-sensitive deals for the user that may expire after 12:00 PM in the next day and may store the time-sensitive deals in the mobile client device 188 prior to the start of the journey. If the user carrying the mobile client device 188 enters the vehicle and departs from home before 12:00 PM in the next day, the verification module 210 determines that the time-sensitive deals are valid at the time when the user starts the vehicle. In this case, data describing the time-sensitive deals may be transmitted from the mobile client device 188 to the vehicle at the time when the user starts the vehicle. However, if the user enters the vehicle and departs from home after 12:00 PM in the next day, the verification module 210 determines that the time-sensitive deals have expired. In this case, the invalid time-sensitive deals may not be sent to the vehicle.

In some implementations, the digital data includes location-based digital data that is customized for the estimated journey. The verification module 210 verifies whether the location-based digital data is still valid for the vehicle based on the current location. For example, the verification module 210 determines that the current location is along the estimated route of the journey and verifies that the location-based digital data is still valid for the vehicle responsive to the current location being along the estimated route of the journey.

In a further example, the journey estimation module 204 may estimate a route associated with a future journey for the user. The update determination module 206 may determine location-based digital data for the vehicle that includes road construction information along the estimated route. The update determination module 206 stores the location-based digital data in the mobile client device 188 before the start of the journey. At the time of travel, if the user drives the vehicle along the estimated route, the update determination module 206 determines that the location-based digital data is still valid. In this case, the location-based digital data may be transmitted from the mobile client device 188 to the vehicle. However, if the user does not drive along the estimated route, the update determination module 206 determines that the location-based digital data is invalid. In this case, the location-based digital data may not be transmitted to the vehicle.

In some implementations, the digital data includes content data customized for one or more users that are likely to participate in the journey. At the time when the journey starts, the verification module 210 verifies whether the digital data is valid for the vehicle by determining whether the one or more users are actually participating in the journey. For example, if a first user from the one or more users does not participate in the journey, the verification module 210 determines that content data customized for the first user is invalid for the vehicle. However, if the first user participates in the journey, the verification module 210 determines that the content data customized for the first user is valid for the vehicle.

If the digital data is valid for the vehicle, the verification module 210 sends the digital data to the vehicle. For example, the digital data may include a series of updates having different data sizes, and the verification module 210 may determine an order to transmit the series of updates to the vehicle based on the different data sizes. The verification module 210 may transmit an update with a smaller size before another update with a larger size.

In some implementations, at least part of the digital data may be transmitted to the vehicle when the user carrying the mobile client device 188 enters the vehicle. In some implementations, at least part of the digital data may be transmitted to the vehicle when the user starts the vehicle. In some implementations, at least part of the digital data may be transmitted to the vehicle when the journey starts. Alternatively or additionally, at least part of the digital data may be transmitted to the vehicle based on a progress of the journey. For example, digital data associated with a location may be transmitted to the vehicle before the vehicle arrives at the location, so that the vehicle may present the digital data to the user prior to arriving at the location. In some implementations, different portions of the digital data are stored in different mobile client devices 188. The different portions of the digital data may be transmitted to the vehicle simultaneously from the different mobile client devices to achieve a faster data transfer speed rather than using a single mobile client device to transfer the digital data.

If the digital data is not valid, the verification module 210 does not send the digital data to the vehicle. In some implementations, a first portion of the digital data is valid and a second portion of the digital data is invalid, the verification module 210 only sends the first portion of the digital data to the vehicle.

The user interface module 212 can be software including routines for generating graphical data for providing user interfaces. The user interface module 212 may be communicatively coupled to the bus 220 via a signal line 230. In some implementations, the user interface module 212 generates graphical data for providing a user interface that allows a user to input data via the user interface. The user interface module 212 sends the graphical data to a display coupled to the mobile client device 188 for presenting the user interface to the user. The user interface module 212 may generate graphical data for providing other user interfaces to the user.

The data forwarding module 214 can be software including routines for forwarding mobile system data from the mobile client device 188 to the data log server 109. The data forwarding module 214 may be communicatively coupled to the bus 220 via a signal line 235. In some implementations, the data forwarding module 214 determines whether there is new mobile system data (e.g., new vehicle data) in the vehicle. If there is new mobile system data in the vehicle, the data forwarding module 214 retrieves the new mobile system data from the vehicle and forwards the new mobile system data to the data log server 109 so that the data log server 109 stores the new mobile system data in a storage device associated with the data log server 109.

Example mobile system data associated with a vehicle (or example vehicle data) includes, but is not limited to, charging configuration data for the vehicle, location data describing a current location of the vehicle, a synchronized local time, and vehicle usage data describing historical usage of the vehicle (e.g., historical journey data including routes, start points, destinations, durations, departure times, arrival times, directions, etc. associated with historical journeys).

In some implementations, the data forwarding module 214 receives the new mobile system data from the vehicle before or after the verification module 210 sends the digital data to the vehicle. In some other implementations, the data forwarding module 214 receives the new mobile system data from the vehicle while the verification module 210 sends the digital data to the vehicle simultaneously.

An example use of the device update application 181 is described herein. The device update application 181 allows a user to push digital data from the mobile client device 188 to a vehicle and to pull vehicle data from the vehicle. When the mobile client device 188 has access to the network 105 prior to a start of a journey (e.g., the mobile client device 188 has access to the Internet from a home network), the device update application 181 determines digital data for the vehicle based on the journey context data describing the journey. The device update application 181 retrieves the digital data from one or more servers and stores the digital data in the mobile client device 188 prior to the start of the journey. When the user gets into the vehicle and starts the vehicle, the device update application 181 detects the presence of the vehicle. The device update application 181 verifies that the digital data is valid for the vehicle and transmits the digital data to the vehicle.

In some implementations, the device update application 181 may use the journey context data to optimize the data pushing process from the mobile client device 188 to the vehicle. For example, the device update application 181 may determine digital data matching the journey context data and may push the matching digital data to the vehicle.

If there are multiple users with multiple mobile client devices 188 onboard in the vehicle, the multiple mobile client devices 188 may transmit respective digital data to the vehicle simultaneously. If the vehicle has new vehicle data, the vehicle may transmit the new vehicle data to the mobile client device 188. The mobile client device 188 may forward the new vehicle data to the data log server 109 when the mobile client device 188 has access to the network 105 again.

Example System Update Application

Figure 3:
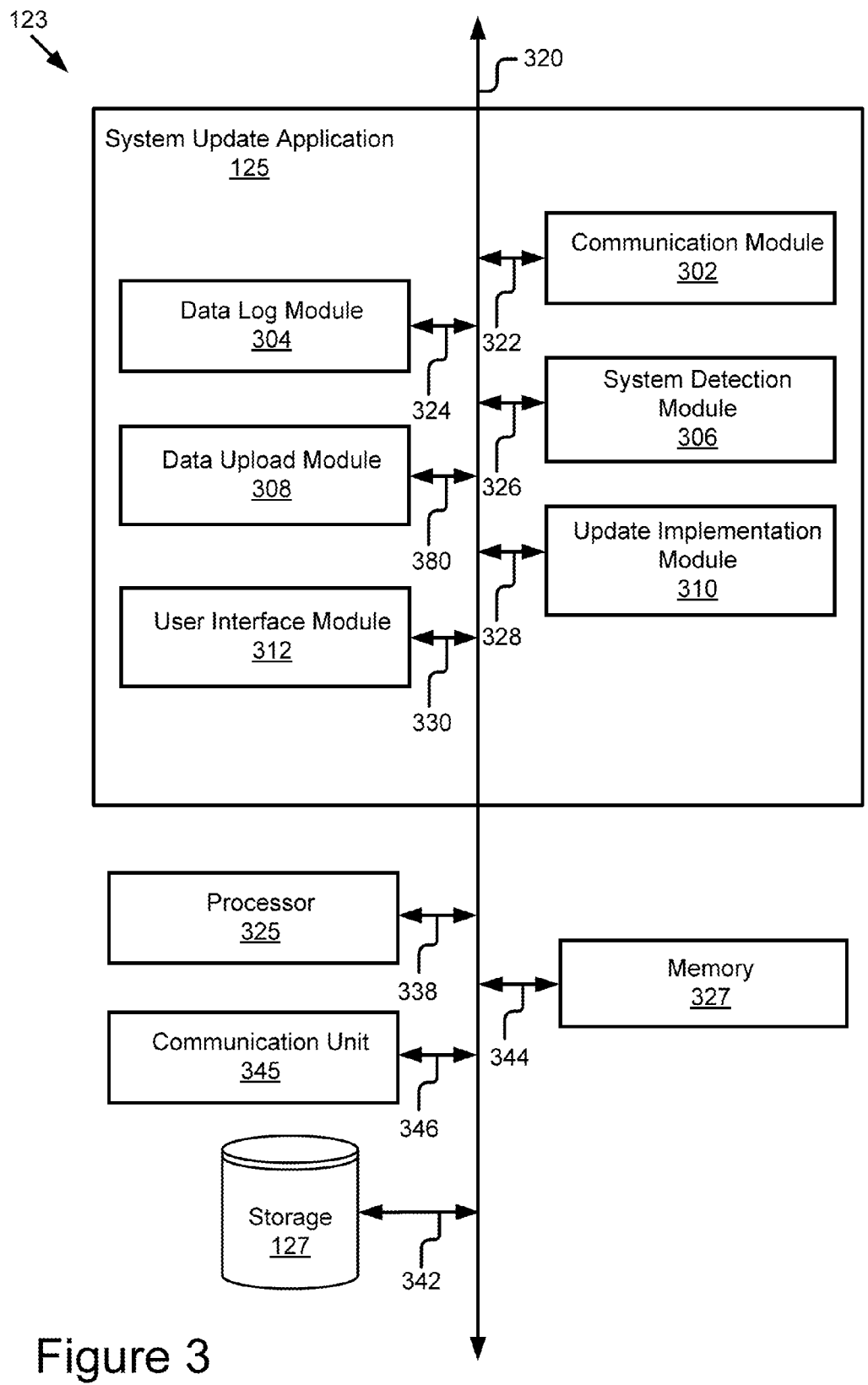
FIG. 3 is a block diagram illustrating an example mobile system that includes an example system update application.

Referring now to FIG. 3, an example of the system update application 125 is shown in more detail. FIG. 3 is a block diagram of the mobile system 123 that includes the system update application 125, a processor 325, a communication unit 345, the storage 127, and a memory 327 according to some examples. The components of the mobile system 123 are communicatively coupled by a bus 320. The storage 127 is communicatively coupled to the bus 320 via a signal line 342.

The processor 325 may have structure similar to the processor 225 and may provide functionality similar to the processor 225. The processor 325 is coupled to the bus 320 for communication with the other components via a signal line 338. The memory 327 may have structure similar to the memory 227 and may provide functionality similar to the memory 227. The memory 327 is coupled to the bus 320 for communication with the other components via a signal line 344. The communication unit 345 may have structure similar to the communication unit 245 and may provide functionality similar to the communication unit 245. The communication unit 345 is coupled to the bus 320 for communication with the other components via a signal line 346. The description for the processor 325, the memory 327, and the communication unit 345 will not be repeated here.

In the illustrated implementation shown in FIG. 3, the system update application 125 includes a communication module 302, a data log module 304, a system detection module 306, a data upload module 308, an update implementation module 310, and a user interface module 312. These components of the system update application 125 are communicatively coupled to each other via the bus 320.

In some implementations, modules of the system update application 125 can be stored in a single server or device. In some other implementations, modules of the system update application 125 can be distributed and stored across multiple servers or devices. Furthermore, the separation of various components, modules, and servers in the implementations described herein should not be understood as requiring such separation in all implementations. In some implementations, the described components, modules, devices, or servers can generally be integrated together in a single component, module, device, or server.

In some implementations, each of the modules 302, 304, 306, 308, 310, and 312 in the system update application 125 can be a set of instructions executable by the processor 325 to provide the functionality described below. In some other implementations, each of the modules 302, 304, 306, 308, 310, and 312 can be stored in the memory 327 of the mobile system 123 and can be accessible and executable by the processor 325. Each of the modules 302, 304, 306, 308, 310, and 312 may be adapted for cooperation and communication with the processor 325 and other components of the mobile system 123.

The communication module 302 can be software including routines for handling communications between the system update application 125 and other components of the mobile system 123. The communication module 302 may be communicatively coupled to the bus 320 via a signal line 322. The communication module 302 sends and receives data, via the communication unit 345, to and from the mobile client device 188. For example, the communication module 302 receives, via the communication unit 345, digital data from the mobile client device 188 and sends the digital data to the update implementation module 310. In another example, the communication module 302 receives new mobile system data from the data upload module 308 and sends the new mobile system data to the mobile client device 188 via the communication unit 345.

In some implementations, the communication module 302 receives data from components of the system update application 125 and stores the data in one or more of the storage 127 and the memory 327. In some implementations, the communication module 302 retrieves data from the storage 127 or the memory 327 and sends the data to one or more components of the system update application 125. In some implementations, the communication module 302 may handle communications between components of the system update application 125.

The data log module 304 can be software including routines for aggregating mobile system data associated with the mobile system 123. The data log module 304 may be communicatively coupled to the bus 320 via a signal line 324. In some implementations, the data log module 304 records mobile system data (e.g., vehicle data) associated with the mobile system 123. The data log module 304 stores the mobile system data in the storage 127. Additionally or alternatively, the data log module 304 may send the mobile system data to the data upload module 308, causing the data upload module 308 to upload the mobile system data to the mobile client device 188.

The system detection module 306 can be software including routines for detecting the presence of the mobile client device 188. The system detection module 306 may be communicatively coupled to the bus 320 via a signal line 326. In some implementations, the system detection module 306 scans for the mobile client device 188 in the surrounding environment. If the mobile client device 188 is in proximity to the mobile system 123, the system detection module 306 detects the presence of the mobile client device 188. For example, if the user carrying the mobile client device 188 is onboard in the mobile system 123, the system detection module 306 detects the presence of the mobile client device 188. Alternatively or additionally, the system detection module 306 receives a user input indicating the mobile client device 188 is in proximity to the mobile system 123. The system detection module 306 detects the presence of the mobile client device 188 based on the user input.

The system detection module 306 may cooperate with the device detection module 208 to authenticate the one or more mobile client devices 188 using one or more authentication procedures. For example, the system detection module 306 on the mobile system 123 may receive a beacon signal from the mobile client device 188 and authenticates the mobile client device 188 based on the beacon signal. The beacon signal may include an identifier of the mobile client device 188. The system detection module 306 may cooperate with the device detection module 208 to establish a communication link between the mobile client device 188 and the mobile system 123. In some implementations, the communication link includes a wireless connection (e.g., Bluetooth®, NFC, etc.). In some other implementations, the communication link includes a wired connection (e.g., a connection using a USB line, a connection using a cable).

The data upload module 308 can be software including routines for uploading mobile system data to the mobile client device 188. The data upload module 308 may be communicatively coupled to the bus 320 via a signal line 380. In some implementations, the data upload module 308 receives mobile system data from the data log module 304. In some other implementations, the data upload module 308 retrieves the mobile system data from the storage 127. Responsive to the system detection module 306 detecting the presence of the mobile client device 188, the data upload module 308 sends the mobile system data to the mobile client device 188. For example, the data upload module 308 determines new mobile system data associated with the mobile system 123 and uploads the new mobile system data to the mobile client device 188.

The update implementation module 310 can be software including routines for implementing updates in the mobile system 123. The update implementation module 310 may be communicatively coupled to the bus 320 via a signal line 328. In some implementations, the update implementation module 310 receives digital data (e.g., update data describing updates) from the mobile client device 188 and applies the updates in the mobile system 123. For example, the digital data includes software program updates, and the update implementation module 310 applies the software program updates to upgrade software programs installed in the mobile system 123. In another example, the digital data includes one or more of time-sensitive updates (e.g., deals, coupons, etc.) and location-based updates (e.g., updated navigation information to a destination, recent road construction information along a route, etc.). The update implementation module 310 provides one or more of the time-sensitive updates and the location-based updates to a user operating on the mobile system 123 using a speaker system or a display device coupled to the mobile system 123. In yet another example, the digital data includes entertainment content data (e.g., movies, music, etc.) customized for one or more users onboard in the mobile system 123, and the update implementation module 310 provides the entertainment content data to the one or more users.

The user interface module 312 can be software including routines for generating graphical data for providing user interfaces. The user interface module 312 may be communicatively coupled to the bus 320 via a signal line 330. In some implementations, the user interface module 312 generates graphical data for providing a user interface that allows a user to input data via the user interface. The user interface module 312 sends the graphical data to a display device coupled to the mobile system 123 for presenting the user interface to the user. The user interface module 312 may generate graphical data for providing other user interfaces to the user.

An example use of the system 100 includes transferring digital data from storage systems to mobile systems 123. Example storage systems may include, but are not limited to, the social network server 101, the data log server 109, the service server 107, the calendar server 177, and any other systems including one or more storage devices. In some implementations, the storage systems may be stationary storage systems.

In some implementations, an update application in the system 100 (e.g., an application similar to a system update application 125 or a device update application 181) may receive data describing a list of first mobile systems 123 and a second mobile system 123. The update application determines digital data to transfer from a storage system to the second mobile system 123. The digital data includes software update data and other suitable digital data described herein. In some implementations, the list of first mobile systems 123 may include one or more mobile client devices 188 (e.g., smartphones). Alternatively or additionally, the list of mobile systems 123 includes one or more vehicles. The second mobile system 123 may include a vehicle.

The update application detects a first network availability between the storage system and one or more first mobile systems 123 from the list of first mobile systems 123. For example, the update application detects that the one or more first mobile systems 123 have access to the network 105 and is connected to the storage system via the network 105. Responsive to detecting the first network availability, the update application transfers the digital data from the storage system to the one or more first mobile systems 123. The update application detects a second network availability between the second mobile system 123 and at least one first mobile system 123 from the one or more first mobile systems 123. For example, the update application detects that the at least one first mobile system 123 is in proximity to the second mobile system 123 and is capable of communicating data with the second mobile system 123. In another example, the update application detects that the at least one first mobile system 123 is capable of establishing communication links with the second mobile system 123. The update application verifies that the digital data is valid for the second mobile system 123 based on journey context data associated with the second mobile system 123. In some examples, the update application verifies that the digital data is valid for the at least one first mobile system 123 based on journey context data associated with the at least one first mobile system 123. Responsive to detecting the second network availability and the digital data being valid, the update application transfers the digital data from the at least one first mobile system 123 to the second mobile system 123.

Another example use of the system 100 includes transferring digital data from mobile systems 123 to storage systems. In some implementations, the update application receives data describing a list of first mobile systems 123 and a second mobile system 123. The update application determines digital data to transfer from the second mobile system 123 to a storage system. In some implementations, the digital data may include mobile system data associated with the second mobile system 123. Alternatively or additionally, the digital data includes software update data.

The update application detects a first network availability between the second mobile system 123 and one or more first mobile systems 123 from the list of first mobile systems 123. For example, the update application detects that each of the one or more first mobile systems 123 is capable of establishing communication links with the second mobile system 123. Responsive to detecting the first network availability, the second mobile system 123 transfers the digital data from the second mobile system 123 to the one or more first mobile systems 123.

The update application detects a second network availability between the storage system and at least one first mobile system 123 from the one or more first mobile systems 123. For example, the update application detects that the at least one first mobile system 123 has access to the network 105 and is capable of communicating with the storage system via the network 105. The update application verifies that the digital data is valid for the at least one first mobile system 123 based on journey context data associated with the at least one first mobile system 123. Responsive to detecting the second network availability and the digital data being valid, the update application transfers the digital data from the at least one first mobile system 123 to the storage system. The update application verifies that the transferred digital data is valid for the storage system.

In some implementations, the digital data such as the software update data is transferred from the second mobile system 123 to the storage system responsive to detecting the second mobile system 123 being in a key-off state. The update application determines a state of a battery management system in the second mobile system 123. For example, the update application determines that a state of charge for a battery in a vehicle is at least 80% full. In another example, the update application determines that the battery has sufficient power for performing software update (e.g., the state of charge of the battery being above a predetermined threshold). The update application performs software update on the second mobile system 123 based on the state of charge of the battery. In some implementations, the update application also performs software update on the one or more first mobile systems 123.

Methods

Figure 4:
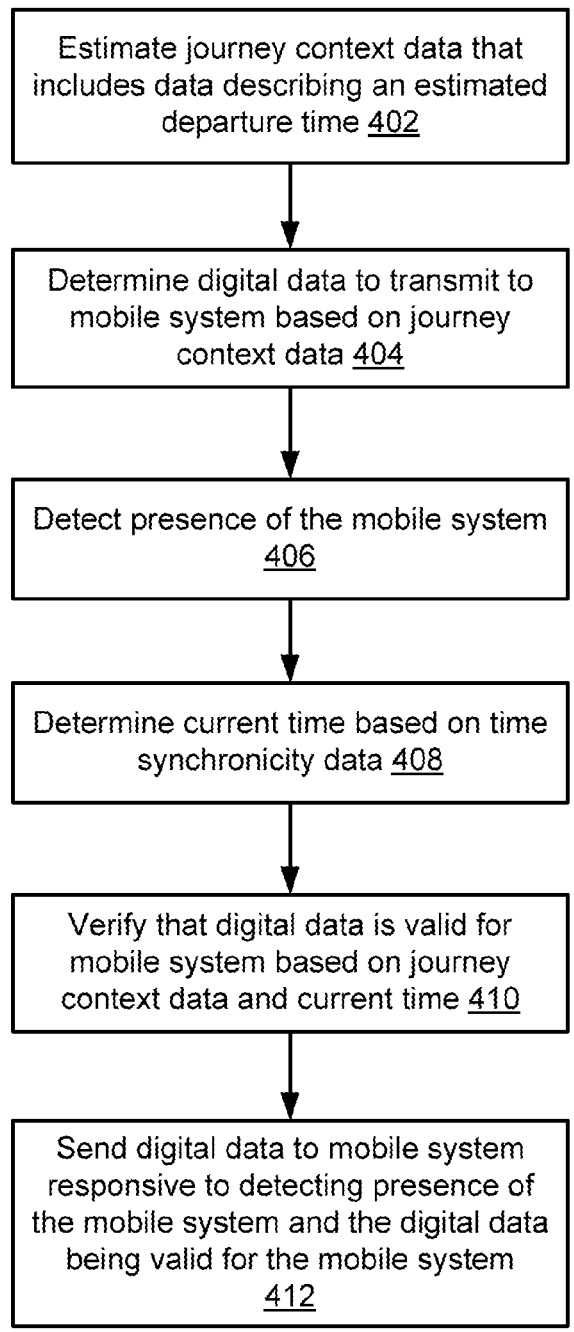
FIG. 4 is a flowchart of an example method for communicating digital data from a mobile client device to a mobile system.

Referring now to FIG. 4, an example of a method 400 for communicating digital data from the mobile client device 188 to the mobile system 123 is described. In some implementations, the method 400 may be performed by modules of the device update application 181 stored on the mobile client device 188. For example, the journey estimation module 204 estimates 402 journey context data that includes data describing an estimated departure time associated with an estimated future journey. The update determination module 206 determines 404 digital data to transmit to the mobile system 123 based on the journey context data. The device detection module 208 detects 406 the presence of the mobile system 123. The verification module 210 determines 408 a current time based on time synchronicity data. The verification module 210 verifies 410 that the digital data is valid for the mobile system 123 based on the journey context data and the current time. The verification module 210 sends 412 the digital data to the mobile system 123 responsive to detecting the presence of the mobile system 123 and the digital data being valid for the mobile system 123.

Figure 5A:
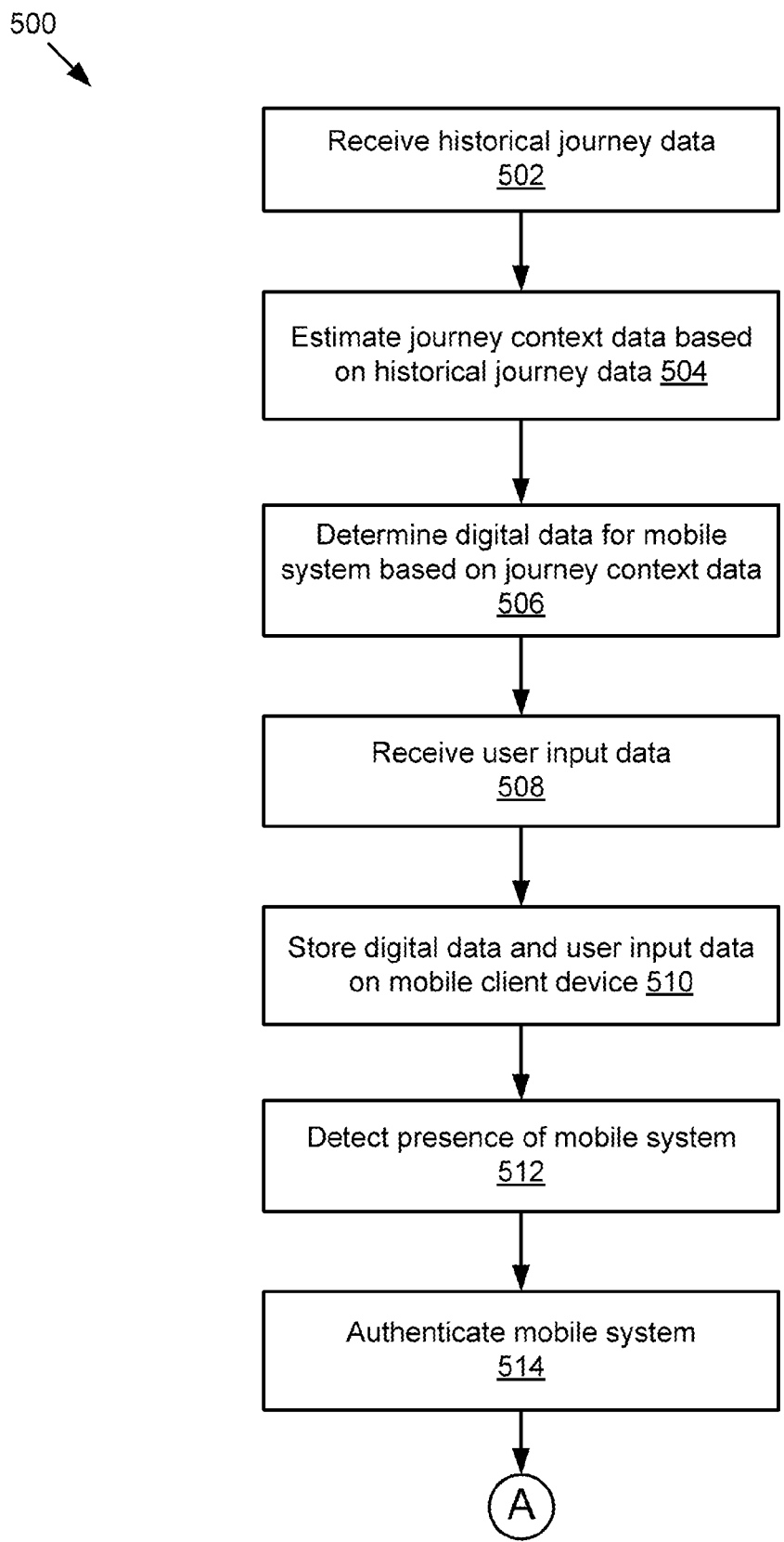
FIGS. 5A and 5B are flowcharts of another example method for communicating digital data from a mobile client device to a mobile system.
Figure 5B:
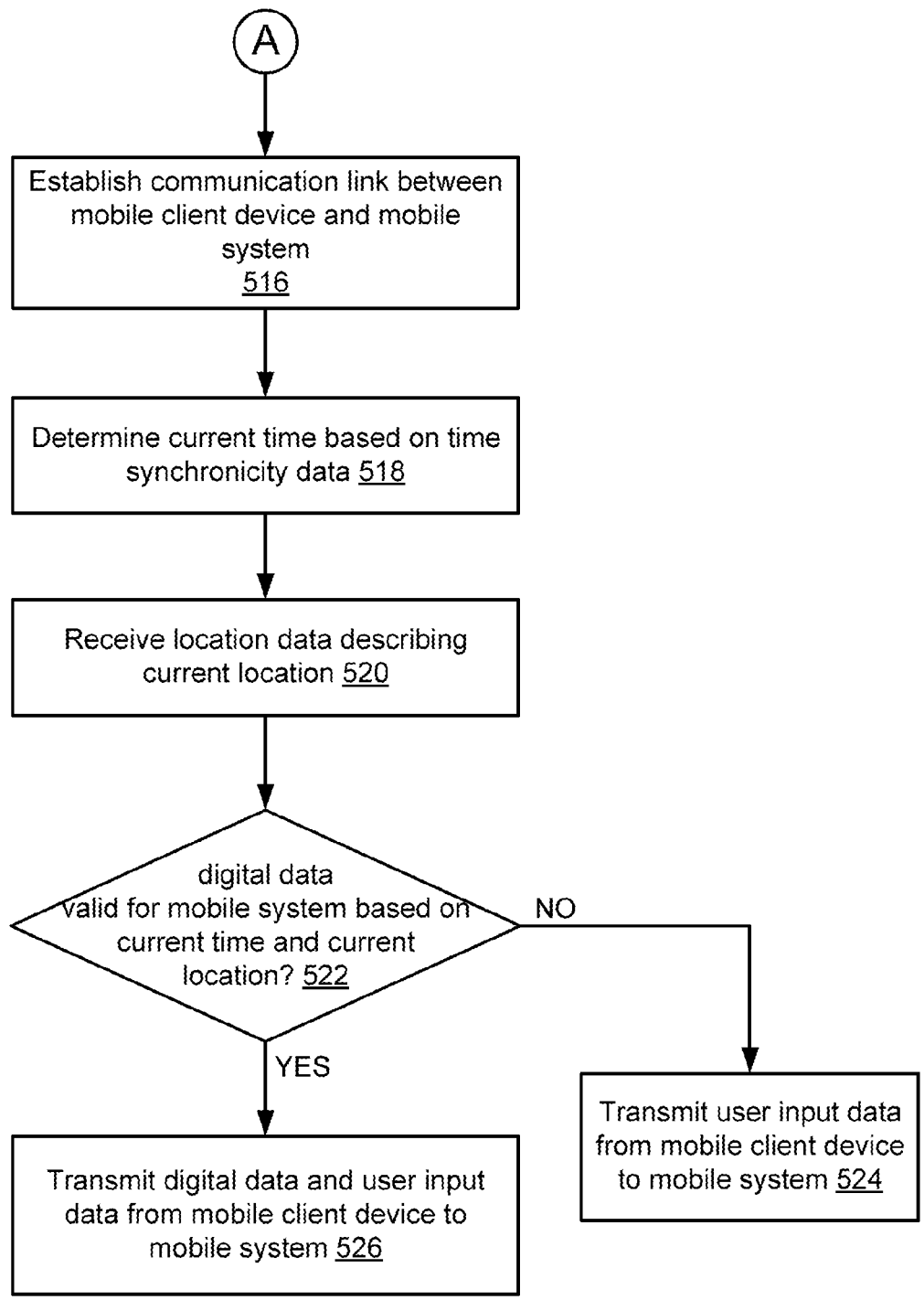

FIGS. 5A and 5B are flowcharts of another example method 500 for communicating digital data from the mobile client device 188 to the mobile system 123. In some implementations, the method 500 may be performed by modules of the device update application 181 stored on the mobile client device 188. Referring to FIG. 5A, the communication module 202 receives 502 historical journey data from the data log server 109 or the storage 185. The journey estimation module 204 estimates 504 journey context data associated with an estimated future journey based on the historical journey data. The journey context data includes an estimated departure time, an estimated arrival time, an estimated destination, and an estimated route associated with the estimated future journey. The update determination module 206 determines 506 digital data for the mobile system 123 based on the journey context data. The communication module 202 receives 508 user input data. The update determination module 206 stores 510 the digital data and the user input data on the mobile client device 188. The device detection module 208 detects 512 the presence of the mobile system 123. The device detection module 208 authenticates 514 the mobile system 123.

Referring to FIG. 5B, the device detection module 208 establishes 516 a communication link between the mobile client device 188 and the mobile system 123. The verification module 210 determines 518 a current time based on time synchronicity data. The verification module 210 receives 520 location data describing a current location. The verification module 210 determines 522 whether the digital data is valid for the mobile system 123 based on one or more of the current time, the current location, and the journey context data. If the digital data is valid, the method 500 moves to block 526. Otherwise, the method 500 moves to block 524. At block 524, the verification module 210 transmits 524 the user input data from the mobile client device 188 to the mobile system 123. At block 526, the verification module 210 transmits the digital data and the user input data from the mobile client device 188 to the mobile system 123.

Figure 6:
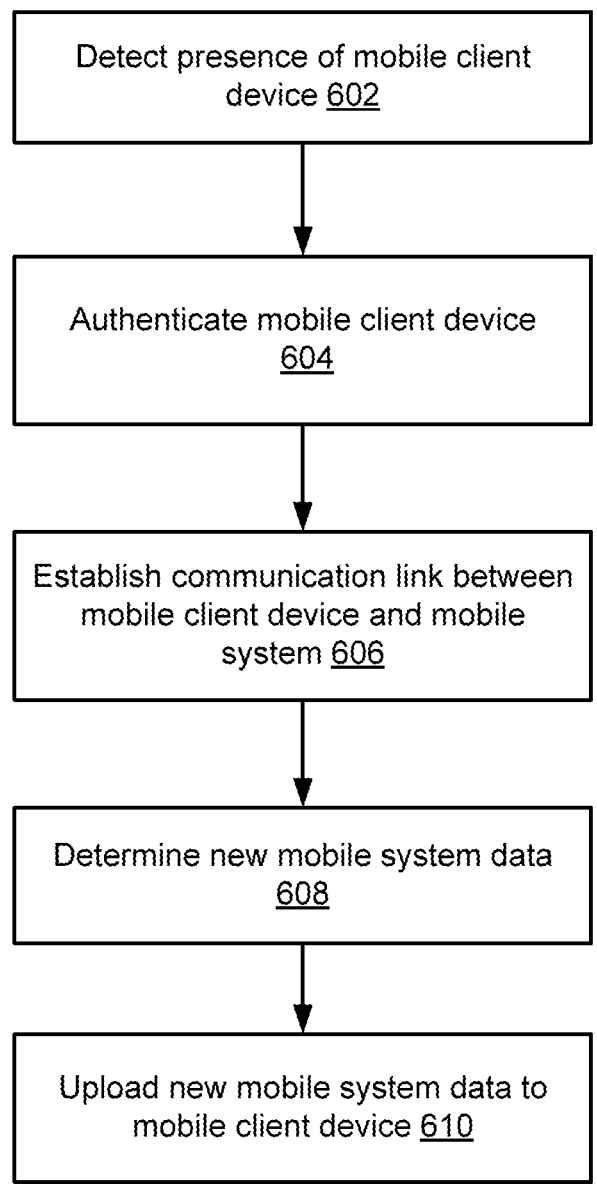
FIG. 6 is a flowchart of an example method for communicating new mobile system data from a mobile system to a mobile client device.

FIG. 6 is a flowchart of an example method 600 for communicating new mobile system data from the mobile system 123 to the mobile client device 188. In some implementations, the method 600 may be performed by modules of the system update application 125 stored on the mobile system 123. For example, the system detection module 306 detects 602 the presence of the mobile client device 188. The system detection module 306 authenticates 604 the mobile client device 188. The system detection module 306 establishes 606 a communication link between the mobile client device 188 and the mobile system 123. The data upload module 308 determines 608 new mobile system data associated with the mobile system 123. The data upload module 308 uploads 610 the new mobile system data to the mobile client device 188.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving data describing a list of first vehicles and a second vehicle;
   determining digital data to transfer from a storage system to the second vehicle;
   detecting a first network availability between the storage system and one or more first vehicles from the list;
   transferring the digital data from the storage system to the one or more first vehicles responsive to detecting the first network availability;
   detecting a second network availability between the second vehicle and at least one first vehicle from the one or more first vehicles;
   verifying that the digital data is valid for the second vehicle based on journey context data associated with a set of users of the second vehicle; and
   responsive to detecting the second network availability and the digital data being valid for the second vehicle, transferring the digital data from the at least one first vehicle to a component of the second vehicle;
   wherein the journey context data describes an estimated future journey for the set of users of the second vehicle based on historical journeys for the set of users and time synchronicity data shared by the one or more first vehicles and the second vehicle; and
   wherein the verifying includes determining whether one or more users included in the set of users are actually participating in the estimated future journey.

2. The method of claim 1, wherein transferring the digital data is further responsive to a progress of a current journey of the second vehicle.

3. The method of claim 1, wherein transferring the digital data includes transferring a first update with a first size before a second update with a second size based on the first size being smaller than the second size.

4. The method of claim 1, wherein the digital data includes entertainment content data customized for the one or more users included in the set.

5. A computer program product comprising a non-transitory computer-usable medium including a computer-readable program, wherein the computer-readable program when executed on a computer causes the computer to:
   receive data describing a list of mobile devices and a vehicle;
   determine digital data to transfer from a storage system to the vehicle;
   detect a first network availability between the storage system and the mobile devices from the list;
   transfer the digital data from the storage system to the mobile devices responsive to detecting the first network availability;
   detect a second network availability between the vehicle and the mobile devices;
   verify that the digital data is valid for the vehicle based on journey context data associated with a set of users of the vehicle; and
   responsive to detecting the second network availability, the digital data being valid for the vehicle, and determining that mobile devices entered the vehicle, transfer the digital data from the mobile devices to a component of the vehicle, wherein the digital data transmitted by each of the mobile devices is different;
   wherein the journey context data describes an estimated future journey for the set of users of the vehicle based on historical journeys for the set of users and time synchronicity data shared by the mobile devices and the vehicle; and
   wherein the verifying includes determining whether the digital data matches a preference for one or more users included in the set of users.

6. The computer program product of claim 5, wherein the digital data transferred by each of the mobile devices is based on a progress of a current journey of the vehicle.

7. The computer program product of claim 5, wherein the digital data transferred by one or more of the mobile devices includes a first update with a first size being transferred before a second update with a second size based on the first size being smaller than the second size.

8. The computer program product of claim 5, wherein the one or more users included in the set of users is a child and the verifying includes determining whether the digital data includes entertainment content data that is customized for the child.

9. The computer program product of claim 8, wherein the entertainment content data includes a preferred entertainment of the child.

10. A system comprising:
    a processor; and
    a memory storing instructions that, when executed, cause the system to:
    receive data describing a list of mobile devices and a vehicle;

determine digital data to transfer from a storage system to the vehicle;

detect a first network availability between the storage system and one or more mobile devices from the list;

transfer the digital data from the storage system to the one or more mobile devices responsive to detecting the first network availability;

detect a second network availability between the vehicle and at least one mobile device from the one or more mobile devices;

verify that the digital data is valid for the vehicle based on journey context data associated with a set of users of the vehicle; and responsive to detecting the second network availability, the digital data being valid, and a starting of the vehicle, transfer the digital data from the at least one mobile device to the vehicle;

wherein the journey context data describes an estimated future journey for the set of users of the vehicle based on (1) time synchronicity data shared by the mobile devices and the vehicle and (2) electronic calendar data describing an appointment for at least one or the users included in the set of users.

11. The system of claim 10, wherein the digital data transferred by each of the mobile devices is based on a progress of a current journey of the vehicle.

12. The system of claim 10, wherein digital data transferred by at least one of the mobile devices includes a first update with a first size being transferred before a second update with a second size based on the first size being smaller than the second size.

13. The system of claim 10, wherein the journey context data includes an estimated start point for the estimated journey, an estimated destination associated with the appointment, an estimated departure time for the estimated journey, an estimated route associated with the estimated start point and the estimated destination, an estimated duration of the estimated journey, and an estimated arrival time at the destination.

14. The system of claim 10, wherein the digital data includes a software update and the vehicle performs the software update based on a state of charge of a battery.

15. The system of claim 10, wherein the journey context data includes an expiration time of a time-sensitive deal, the digital data includes the time-sensitive deal, and the digital data is valid based on a start time of starting the vehicle occurring before the expiration time.

16. The system of claim 10, wherein the journey context data includes an expiration time of a time-sensitive deal, the digital data includes the time-sensitive deal, and the digital data is valid based on a current location of the vehicle being on an estimated route of a journey.

* * * * *